United States Patent Office 3,530,123
Patented Sept. 22, 1970

3,530,123
3-THIOLATED-7-SYDNONE-ACYLAMINO-CEPH-
ALOSPORANIC ACID DERIVATIVES
Tadayoshi Takano, Hirakata, Hirokichi Harada, Nishino-
miya, Masaru Kurita, Takatsuki, Masashi Hashimoto,
Osaka, and Hiroo Nikaido, Ikeda, Japan, assignors to
Fujisawa Pharmaceutical Co., Ltd., Osaka, Japan, a
company of Japan
No Drawing. Filed Oct. 31, 1967, Ser. No. 679,529
Claims priority, application Japan, Nov. 2, 1966,
41/72,514
Int. Cl. C07d 99/24
U.S. Cl. 260—243      11 Claims

ABSTRACT OF THE DISCLOSURE

The compounds of this invention are 3-thiolated 7-syd-
nonecephalosporin compounds. These compounds exhibit
significant activity against a wide variety of microorgan-
isms including both gram-negative and gram-positive bac-
teria.

This invention relates to the thiolated sydnonecephalo-
sporin compounds and processes for the preparation there-
of. More particularly, it relates to the 3-thiolated-7-syd-
none-acylaminocephalosporanic acid compounds and
processes for the preparation thereof.

It is an object of this invention to provide the 3-thio-
lated 7-sydnoneacylaminocephalosporanic acid com-
pounds possessing an antibacterial activity.

It is another object of this invention to provide processes
of preparing the same compounds. Other objects and ad-
vantageous features will become apparent in the light of
the disclosure as described hereinbelow.

The compounds used in this invention can be illustrated
by the following structural formulae:

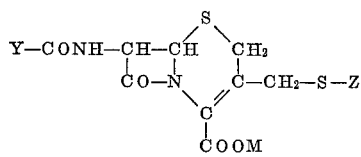

in which Y is the group,

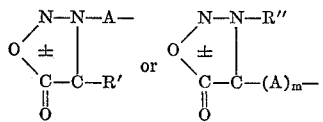

wherein R' is hydrogen, halogen, alkyl, substituted alkyl,
aryl, substituted aryl, aralkyl or substituted aralkyl, R" is
alkyl, substituted alkyl, aryl, substituted aryl, aralky or
substituted aralkyl, A is alkylene, substituted alkylene,
arylene-alkylene or substituted arylene-alkylene, and m is
zero or one; Z is alkyl, substituted alkyl, aryl, substituted
aryl, acyl or heteromonocyclic or heterobicyclic contain-
ing in an individual ring at least one hetero atom; and M
is hydrogen or a pharmaceutically acceptable cation. The
halogen atom can include chlorine, bromine, and the like.

The alkyl radical can be the monovalent aliphatic hy-
drocarbon having from one to four carbon atoms and a
straight or branched chain and specifically, methyl, ethyl,
propyl, isopropyl, butyl, t-butyl, and the like. Some exam-
ples of the substituent of the substituted alkyl radical as
represented by R' and R" are hydroxy and halogen, and
those as represented by Z are hydroxy, halogen, amino and
carboxyl. Accordingly, the substituted alkyl radicals can
include hydroxymethyl, hydroxyethyl, chloromethyl,
chloroethyl, aminomethyl, aminoethyl, carboxymethyl,
carboxylethyl, amino-carboxylethyl, and the like.

The aryl radical can be the aromatic hydrocarbon and
specifically, phenyl, naphthyl, and the like. As some exam-
ples of the substituent of the substituted aryl radical as
represented by R' and R" are hydroxy, halogen, nitro,
alkyl and alkoxy, and those as represented by Z are halo-
gen, nitro, amino, carboxyl, alkyl and alkoxy, the substi-
tuted aryl radicals can include hydroxyphenyl, chloro-
phenyl, chloronaphthyl, nitrophenyl, nitronaphthy, amino-
phenyl, aminonaphthyl, carboxyphenyl, tolyl, methoxy-
phenyl, and the like.

The unsubstituted or substituted aralkyl radicals can
include the monovalent aryl-substituted aliphatic hydro-
carbon having a straight or branched chain and one to
four carbon atoms wherein a hydroxy, halogen, nitro,
alkyl or alkoxy substituent can be attached to the carbon
atom of the benzene ring, and specifically, benzyl, phen-
ethyl, hydroxybenzyl, hydroxyphenethyl, chlorobenzyl,
chlorophenethyl, nitrobenzyl, nitrophenethyl, methylben-
zyl, methylphenethyl, methoxybenzyl, methoxyphenethyl,
and the like.

The acyl radical can include the residue of an aliphatic,
aromatic and heterocyclic carboxylic acids either unsub-
stituted or substituted by a halogen, amino or nitro sub-
stituent, and specifically, acetyl, propionyl, butyryl, benz-
oyl, chlorobenzoyl, aminobenzoyl, nitrobenzoyl, nicotino-
yl, isonicotinoyl, thenoyl, and the like.

The unsubstituted or substituted heteromonocyclic or
heterobicyclic ring systems containing in an individual
ring of the bicyclic ring system at least one hetero atom
can include pyridine, pyrazole, imidazole, pyridazine, py-
rimidine, pyrazine, triazole, triazine, tetrazole, oxazole,
oxadiazole, thiazole, thiadiazole, thiatriazole, triazolopyri-
dine, purine, and the like, which can contain one or more
substituents such as a halogen, amino, alkyl, alkoxy, aryl,
aralkyl or thienyl substituent.

The unsubstituted or substituted alkylene radical can
include the divalent aliphatic hydrocarbon having from
one to four carbon atoms and a straight or branched chain,
or containing an aryl or aralkyl substituent, and specifical-
ly, methylene, ethylene, propylene, butylene, methylmeth-
ylene, methylethylene, phenylmethylene, phenylethylene,
benzylethylene, and the like.

The unsubstituted or substituted arylene-alkylene radi-
cal can include phenylene-methylene, phenylene-ethylene,
chlorophenylene-methylene, and the like.

One of the starting materials, the amphoteric 7-amino-
cephalosporanic acid, can be prepared by hydrolyzing the
antibiotic cephalosporin C according to the well known
methods. In the preparation of the compounds used in
this invention, the above amphoteric acids can be used
in a free acid or in a form of a salt of an alkali metal
such as sodium or potassium.

One of other starting materials, sydnone acids, can be
prepared from the N-nitroso derivatives of N-substituted
α-amino acids according to the methods described in
Chemical Review, vol. 84, pp. 129–147 (1964). The large
number of the sydnone acids to be used in the preparation
of the compounds of this invention can be divided roughly
into two groups: sydnone-3 and 4-acids. Among the syd-
none-3-acids can be included sydnone-3-acetic acid, syd-
none-3-propionic acid, sydnone-3-butyric acid, sydnone-
3-(α-methyl) acetic acid, sydnone-3-(α-phenyl)-acetic
acid, sydnone-3-(α-benzyl) acetic acid, sydnone-3-(α-
methyl) propionic acid, sydnone-3-(α-phenyl) propionic
acid, sydnone-3-(α-benzyl) propionic acid, sydnone-3-(α-
methyl) butyric acid, p-3-sydnonyl)-phenyl acetic acid,
and the like. These sydnone acids can carry on the 4-
position of the sydnone ring one substituent of a number
of types as represented by R', preferably hydrogen, chlo-
rine, bromine, methyl, ethyl, propyl, isopropyl, butyl, iso-
butyl, t-butyl, hydroxymethyl, hydroxyethyl, chloromethyl, chloroethyl, phenyl, naphthyl, hydroxyphenyl, hydroxynaphthyl, chlorophenyl, chloronaphthyl, nitrophenyl, nitronaphthyl, tolyl methoxyphenyl, benzyl, phenethyl, chlorobenzyl, hydroxybenzyl, methoxybenzyl, chlorophenethyl, hydroxyphenethyl, methylphenethyl and the like. Similarly the sydnone-4-acids can include sydnone-4-carboxylic acid, sydnone-4-acetic acid, sydnone-4-propionic acid, sydnone-4-butyric acid, sydnone-4-(α-methyl) acetic acid, sydnone-4-(α-phenyl)-acetic acid, sydnone-4-(α-benzyl) acetic acid, sydnone-4-(α-methyl) propionic acid, sydnone-4-(α-phenyl) propionic acid, sydnone-4-(α-benzyl) propionic acid, sydnone-4-(α-methyl) butyric acid, p-(4-sydnonyl) phenyl-acetic acid and the like, each containing on the 3-position of the sydnone ring the same substituent as, other than the hydrogen and halogen substituents, enumerated above under the substituent on the 4-position of the sydnone-3-acids. The reactive derivatives of these sydnone acids also can be used in the form of the acid halides, acid amides, acid esters or acid anhydrides.

As the thiols to be used as another starting material there can be illustrated specifically by the following:

(1) aliphatic thiols:
methanethiol,
ethanethiol,
2-aminoethanethiol,
2-bromoethanethiol,
1-chloroethanethiol,
2-hydroxyethanethiol,
mercaptoacetic acid,
3-mercaptopropionic acid,
2-amino-3-mercaptopropionic acid, (2) aromatic thiols:
benzenethiol,
o-aminobenzenethiol,
p-chlorobenzenethiol,
p-bromobenzenethiol,
p-nitrobenzenethiol,
o-mercaptobenzoic acid,
p-methoxy-benzenethiol,
p-toluenethiol,
m-toluenethiol,
1-naphthalenethiol,
4-chloro-1-naphthalenethiol,
4-nitro-1-naphthalenethiol, (3) heterocyclic thiols:

(a)
2-pyridinethiol,
3-amino-2-pyridinethiol,
2-chloro-3-pyridinethiol,
4-chloro-3-pyridinethiol,
4-pyridinethiol,
3-bromo-4-pyridinethiol,
5-nitro-2-pyridinethiol, (b)
3-methyl-1-phenyl-5-pyrazolethiol, (c)
imidazole-2-thiol,
1-methyl-2-imidazolethiol,
4-methyl-2-imidazolethiol,
1-phenyl-2-imidazolethiol,
4,5-dimethyl-2-imidazolethiol,
5-p-tolyl-2-imidazolethiol,
1-methyl-5-nitro-2-imidazolethiol,
4-amino-1-methyl-2-imidazolethiol, (d)
3-pyridazinethiol,
4-amino-3-pyridazinethiol,
6-bromo-3-pyridazinethiol,
6-methyl-3-pyridazinethiol,
6-methoxy-3-pyridazinethiol, (e)
4-pyrimidinethiol,
4-methyl-2-pyrimidinethiol,
2-amino-4-pyrimidinethiol,
2-amino-6-chloro-4-pyrimidinethiol,
2-amino-6-methyl-4-pyrimidinethiol,
2-amino-6-nitro-4-pyrimidinethiol,
6-methyl-4-pyrimidinethiol,
5-methoxy-4-pyrimidinethiol, (f)
2-pyrazinethiol, (g)
s-triazole-3-thiol,
5-amino-s-triazole-3-thiol,
5-benzyl-s-triazole-3-thiol,
5-methyl-s-triazole-3-thiol,
5-phenyl-s-triazole-3-thiol,
1-phenyl-1H-1,2,4-triazole-3-thiol,
1-benzyl-3-methyl-1H-1,2,4-triazole-5-thiol,
1,3-dimethyl-1H-1,2,4-triazole-5-thiol,
1-methyl-1H-1,2,4-triazole-5-thiol,
3-methyl-1-phenyl-1H-1,2,4-triazole-5-thiol,
4-amino-5-benzyl-4H-1,2,4-triazole-3-thiol,
5-benzyl-4-methyl-4H-1,2,4-triazole-3-thiol,
4,5-dimethyl-4H-1,2,4-triazole-3-thiol,
4-methyl-4H-1,2,4-triazole-3-thiol,
4-methyl-5-phenyl-4H-1,2,4-triazole-3-thiol,
5-methyl-4-phenyl-4H-1,2,4-triazole-3-thiol,
4-phenyl-4H-1,2,4-triazole-3-thiol, (h)
as-triazine-3-thiol,
5-amino-6-methyl-as-triazine-3-thiol,
5,6-dimethyl-as-triazine-3-thiol,
5,6-diphenyl-as-triazine-3-thiol,
5-methyl-6-phenyl-as-triazine-3-thiol,
s-triazine-2-thiol,
4-methyl-s-triazine-2-thiol,
4-chloro-6-methyl-s-triazine-2-thiol, (i)
1H-tetrazole-5-thiol,
1-benzyl-1H-tetrazole-5-thiol,
1-p-chlorophenyl-1H-tetrazole-5-thiol,
1-ethyl-1H-tetrazole-5-thiol,
1-isopropyl-1H-tetrazole-5-thiol,
1-methyl-1H-tetrazole-5-thiol,
1-phenyl-1H-tetrazole-5-thiol,
1-propyl-1H-tetrazole-5-thiol,
1-o-tolyl-1H-tetrazole-5-thiol, (j)
2-oxazolethiol,
4-methyl-2-oxazolethiol, (k)
5-benzyl-1,3,4-oxadiazole-2-thiol,
5-p-chlorophenyl-1,3,4-oxadiazole-2-thiol,
5-isopropyl-1,3,4-oxadiazole-2-thiol,
5-methyl-1,3,4-oxadiazole-2-thiol,
5-ethyl-1,3,4-oxadiazole-2-thiol,
5-phenyl-1,3,4-oxadiazole-2-thiol,
5-propyl-1,3,4-oxadiazole-2-thiol,
5-(2-thienyl)-1,3,4-oxadiazole-2-thiol,
3-phenyl-1,2,4-oxadiazole-5-thiol, (l)
2-thiazolethiol,
5-amino-2-thiazolethiol,
4-benzyl-2-thiazolethiol,
4,5-dimethyl-2-thiazolethiol,
4-methyl-2-thiazolethiol,
5-methyl-2-thiazolethiol,
5-phenyl-2-thiazolethiol, (m)

1,2,4-thiadiazole-3-thiol,
5-methyl-1,2,4-thiadiazole-3-thiol,
1,2,4-thiadiazole-5-thiol,
3-benzyl-1,2,4-thiadiazole-5-thiol,
3-methyl-1,2,4-thiadiazole-5-thiol,
3-phenyl-1,2,4-thiadiazole-5-thiol,
1,3,4-thiadiazole-2-thiol,
5-amino-1,2,4-thiadiazole-2-thiol,
5-p-chlorophenyl-1,3,4-thiadiazole-2-thiol,
5-benzyl-1,3,4-thiadiazole-2-thiol,
5-methyl-1,3,4-thiadiazole-2-thiol,
5-phenyl-1,3,4-thiadiazole-2-thiol, (n)

1,2,3,4-thiatriazole-5-thiol, (o)

s-triazolo [4,3-a] pyridine-3-thiol,
v-triazolo [1,5-a] pyridine-6-thiol, (p)

purine-2-thiol,
6-aminopurine-2-thiol,
purine-6-thiol,
2-aminopurine-6-thiol, (5) thioacids:

thioacetic S-acid,
thiopropionic S-acid,
thiobenzoic S-acid,
p-chlorothiobenzoic S-acid,
p-nitrothiobenzoic S-acid,
m-aminothiobenzoic S-acid,
2-pyridinecarbothioic S-acid,
3-pyridinecarbothioic S-acid,
4-pyridinecarbothioic S-acid,
2-thiophenecarbothioic S-acid, and the like.

In the preparation of the compounds of this invention, a few routes are possible, as described below. The first step is the acylation of 7-aminocephalosporanic acid or salts thereof with the sydnone acids or reactive derivatives thereof to form the sydnone-acylated cephalosporanic acids. The second step is that the sydnone-acylate produced above are modified by reaction with thiols which replace the acetoxyl group on the exocyclic methylene. Alternatively, the 3-thiolated cephalosporins which are obtained by reacting 7-aminocephalosporanic acid or salts thereof with thiols can be acylated with the sydnone acids or reactive derivatives thereof.

In addition to the reaction of 7-aminocephalosporanic acid or salts thereof with thiols, the 3-thiolated cephalosporins which are useful in preparation of the compounds of this invention can be prepared by hydrolyzing the 3-thiolated cephalosporin C which can be modified by reaction with both the above antibiotic, cephalosporin C, and the thiols.

In the acylation of 7-aminocephalosporanic acid, the 3-thiolated cephalosporins or salts thereof with the sydnone acids, the reaction is carried out in a solvent such as acetone, dioxane, chloroform, ethylene chloride, tetrahydrofuran, dimethylformamide, dimethylsulfoxide, and any other inert organic solvent. Although the acylation reaction is accomplished in the presence of a base and a condensing agent, it is desired to conduct the reaction using reactive derivatives of sydnone acids in the absence of a condensing agent. A variety of the bases such as sodium bicarbonate, triethylamine, triethanolamine, pyridine and the like may be used, triethylamine being preferred. As the condensing agents, there can be included N,N'-diethylcarbodiimide, N,N' - di - n -propylcarbodiimide, N,N'-diisopropylcarbodiimide, N,N'-di-n-butylcarbodiimide, N,N'-diisobutylcarbodiimide, N-propyl-N'-allylcarbodiimide, N,N'-dicyclohexylcarbodiimide, N - ethyl-N'-(4-ethylmorpholino)-carbodiimide, N-cyclohexyl - N' - morpholinoethylcarbodiimide, N,N'-carbonyldi(2-methylimidazole), pentamethyleneketene - N - cyclohexylimine, diphenylketene-N-cyclohexylimine, 1-ethoxy-1-chloroethylene, tetraethyl phosphite, ethyl polyphosphate, isopropyl polyphosphate, phosphorus oxychloride, phosphorus trichloride, oxalyl chloride, thionyl chloride, N-ethyl-5-phenylisoxazolium-3'-sulfonate and the like. A preferred one is N,N'-dicyclohexylcarbodiimide. Furthermore, it is preferred to carry out the acylation at about room temperature although lower temperature can be employed when the particular reactants are unduly susceptible to decomposition.

On the other hand, the nucleophilic displacement of the acetoxy group of the cephalosporins occurs readily with the thiols in a number of solvents, preferably polar solvents like water, aqueous acetone, ether, chloroform, aqueous methanol, ethanol, dimethylformamide, dimethylsulfoxide and the like. The nucleophilic reaction can also be carried out in a buffer such as a phosphate or borate buffer. If the free acids of the sydnone acylated cephalosporins and 7-aminocephalosporanic acid are used, the reaction is carried out in the presence of the bases such as sodium bicarbonate, triethylamine and the like. It is preferred to carry out the reaction at a temperature within the range from about 30–70° C.

In the preferred embodiment of the preparation of the sydnone-acylated cephalosporins in accordance with this invention, 7-aminocephalosporanic acid which is dissolved in an appropriate solvent like chloroform in addition of a base like triethylamine is reacted with the sydnone acid or its reactive derivative dissolved in tetrahydrofuran in the presence or absence of a condensing agent like dicyclohexylcarbodiimide. The reaction mixture is stirred at about room temperature or under cooling. After the reaction is terminated, the desired material is separated by conventional means, such as by concentration of the reaction mixture and extraction with the base like sodium bicarbonate or ethyl acetate.

Further, in the preferred embodiment of the preparation of the 3-thiolated cephalosporins in accordance with this invention 7-aminocephalosporanic acid or its salt and thiol are reacted in aqueous acetone in the presence of the appropriate base at a temperature within the range of about 30–70° C. The desired compounds can be separated by conventional means.

The pharmaceutically acceptable salts of the compounds of this invention can be formed with an alkali metal hydroxide, an alkali metal carbonate, an alkali metal acetate, an alkali metal salicylate, or organic base such as dicyclohexylamine, N,N'-dibenzylethylenediamine, procaine, and the like.

The following examples are illustrative of the compounds of this invention.

EXAMPLE 1

A solution of 500 mg. of 1-p-chlorophenyl-1H-tetrazole-5-thiol and 20 mg. of sodium bicarbonate in 20 ml. of 75% aqueous acetone solution was added to a solution of 800 mg. of 7-(sydnone-3-acetamido) cephalosporanic acid and 170 mg. of sodium bicarbonate in 8 ml. of water. The resultant solution was refluxed for 6 hours with stirring. After acetone was removed, the concentrate was adjusted to pH 4.0 with 5% hydrochloric acid and treated with ether. The aqueous layer was washed with ether, adjusted to pH 2.0 with hydrochloric acid and extracted with ethyl acetate. The extract was washed with water, dried and concentrated under reduced pressure. The residue was treated with ether to obtain 105 mg. of 7-(synone-3-acetamido)-3-(1-p-chlorophenyl-1H - tetrazole-5-ylthiomethyl)-3-cephem4-carboxylic acid melting at 123–128° C. (decomposed).

UV in 0.2% aqueous sodium bicarbonate solution $\lambda_{max.}$ 273 m$\mu$, $E_{1cm}^{1\%}$ 262

MIC (mcg./ml.) *E. coli* 5, *Staph, aureus* 2.5

EXAMPLE 2

Following the procedure of Example 1 but substituting 1-phenyl - 1H - tetrazole-5-thiol for 1-p-chlorophenyl-1H-tetrazole-5-thiol, there was obtained 7-(sydnone-3-acetamido) - 3 - (1 - phenyl - 1H - tetrazol-5-ylthiomethyl)-3-cephem-4-carboxylic acid, melting at 174° C. (decomposed).

UV in 20% tetrahydrofuran, $$\lambda_{max}. \ 272 \ m\mu, \ E_{1\,cm}^{1\%} \ 323$$

MIC (mcg./ml.) E. coli 20, Staph. aureus 2.5

Similarly, substituting s-triazolo [4,3-a] pyridine-3-thiol for 1-phenyl-1H-tetrazole-5-thiol, there was obtained 7-(sydnone-3-acetamido) - 3 - (s - triazolo[4,3-a] - pyrid - 3 - ylthiomethyl)-3-cephem-4-carboxylic acid, melting at 92–95° C. (decomposed).

UV in 0.2 aqueous sodium bicarbonate solution, $$\lambda_{max}. \ 237 \ m\mu, \ E_{1\,cm}^{1\%} \ 290$$

$$\lambda_{max}. \ 281 \ m\mu, \ E_{1\,cm}^{1\%} \ 249$$

MIC (mcg./ml.) E. coli 10, Staph. aureus 2.5

EXAMPLE 3

A solution of 1.0 g. of 7-(sydnone-3-acetamido) cephalosporanic acid and 220 mg. of sodium bicarbonate in 10 ml. of water was added to a solution of 600 mg. of 5-methyl-s-triazole-3-thiol and 440 mg. of sodium bicarbonate in 10 ml. of water. The resultant solution was reacted for 5 hours at 60° C., adjusted to pH 2.0 with diluted hydrochloric acid and extracted with ether. After the aqueous layer was treated with ethyl acetate, the ethyl acetate layer separated was washed with water, dried over sodium sulfate, concentrated in vacuo and treated with ether. The resultant residue was dissolved in a small amount of acetone and treated with ether to obtain 7-(sydnone-3-acetamido)-3-(5-methyl-s - triazol - 3 - ylthiomethyl)-3-cephem-4-carboxylic acid, melting at 100–110° C. (decomposed).

UV in phosphate buffer at pH 6.4, $$\lambda_{max}. \ 276 \ m\mu, \ E_{1\,cm}^{1\%} \ 250$$

MIC (mcg./ml.) E. coli 10, Staph. aureus 1

EXAMPLE 4

A solution of 800 mg. of 5-methyl-1,3,4-oxadiazole-2-thiol, 575 mg. of sodium bicarbonate and 2.0 g. of sodium 7-(sydnone-3-acetamido)-cephalosporanate in 10 ml. of water was treated for 7 hours at 60° C. The reaction mixture was adjusted to pH 3.0 with 5% hydrochloric acid, extracted with ethyl acetate and distilled in vacuo leaving the powder which was treated with ethyl and acetone to obtain 8 mg. of 7-(sydnone-3-acetamido)-3-(5-methyl-1,3,4-oxadiazol-2-ylthiomethyl)-3-cephem - 4 - carboxylic acid melting at 196° C. (decomposed).

UV in phosphate buffer at pH 6.4, $$\lambda_{max}. \ 277 \ m\mu, \ E_{1\,cm}^{1\%} \ 330$$

EXAMPLE 5

Following the procedure of Example 4 but substituting 5-phenyl-1,3,4-oxadiazole-2-thiol for 5-methyl-1,3,4-oxadiazole-2-thiol, there was obtained 7-(sydnone-3-acetamido)-3-(5-phenyl-1,3,4-oxadiazol - 2 - ylthiomethyl) - 3 - cephem-4-carboxylic acid, melting at 175–178° C. (decomposed).

UV in phosphate buffer at pH 6.4, $$\lambda_{max}. \ 279 \ m\mu, \ E_{1\,cm}^{1\%} \ 510$$

Similiarly, substituting 5-p-chlorophenyl-1,3,4-oxadiazole-2-thiol for 5-phenyl-1,3,4-oxadiazole-2-thiol, there was obtained 7 - (5 - p-chlorophenyl-1,3,4-oxadiazol-2-ylthiomethyl)-3-cephem-4-carboxylic acid, melting at 191–194° C. (decomposed).

UV in phosphate buffer at pH 6.4, $$\lambda_{max}. \ 283 \ m\mu, \ E_{1\,cm}^{1\%} \ 546$$

Similarly, substituting 5-benzyl-1,3,4-oxadiazole-2-thiol for 5-p-chlorophenyl-1,3,4-oxadiazole-2-thiol, there was obtained 7-(sydnone-3-acetamido)-3-(5-benzyl-1,3,4-oxadiazol-2-ylthiomethyl)-3-cephem-4-carboxylic acid, melting at 86–90° C. (decomposed).

UV, in 95% ethanol, $$\lambda_{max}. \ 267 \ m\mu, \ E_{1\,cm}^{1\%} \ 323$$

EXAMPLE 6

To a solution of 6.0 g. of sodium 7-(sydnone-3-acetamido)cephalosporanate in 60 ml. of a phosphate buffer (pH 5.29) containing M/15 potassium phosphate and M/15 sodium biphosphate was added 2.0 g. of 5-methyl-1,3,4-thiadiazole-2-thiol. The solution was then stirred at 60–62° C. for 4 hours. The resulting reaction mixture was adjusted with 10% hydrochloric acid to pH 2.0 and extracted with 650 ml. of ethyl acetate. The ethyl acetate layer was then washed with two 40 ml. portions of a saturated sodium chloride solution, dried over sodium sulfate and concentrated to obtain 7-(sydnone-3-acetamido)-3-(5-methyl - 1,3,4-thiadiazol-2-ylthiomethyl)-3-cephem-4-carboxylic acid, melting at 194–196° C. (decomposed).

UV, in phosphate buffer at pH 6.4, $$\lambda_{max}. \ 280 \ m\mu, \ E_{1\,cm}^{1\%} \ 331$$

EXAMPLE 7

Following the procedure of Example 6 but substituting the appropriate thiol for 5-methyl-1,3,4-thiadiazole-2-thiol, there were obtained the following compounds:

(a) 7-(sydnone-3-acetamido)-3-(5-phenyl - 1,3,4 - thiadiazol-2-ylthiomethyl)-3-cephem-4-carboxylic acid, M.P. 186° C. (decomposed).

UV, in 95% ethanol, $$\lambda_{max}. \ 298 \ m\mu, \ E_{1\,cm}^{1\%} \ 441$$

(b) 7-(sydnone-3-acetamido)-3-(1,3,4-thiadiazol-2 - ylthiomethyl)-3-cephem-4-carboxylic acid. M.P. 208–209° C. (decomposed).

(c) 7-(sydnone-3-acetamido)-3-(5-amino-1,3,4-thiadiazol-5-ylthiomethyl)-3-cephem-4-carboxylic acid.

UV, in phosphate buffer at pH 6.4, $$\lambda_{max}. \ 286 \ m\mu, \ E_{1\,cm}^{1\%} \ 325$$

(d) 7-(sydnone-3-acetamido)-3-(3-methyl - 1,2,4 - thiadiazol-5-ylthiomethyl)-3-cephem-4-carboxylic acid. M.P. 198–200° C. (decomposed).

UV, in 95% ethanol, $$\lambda_{max}. \ 281 \ m\mu, \ E_{1\,cm}^{1\%} \ 385$$

(e) 7-(sydnone-3-acetamido)-3-(1,2,3,4-thiatriazol - 5 - ylthiomethyl)-3-cephem-4-carboxylic acid. M.P. 147–150° C. (decomposed).

UV, in 95% ethanol, $$\lambda_{max}. \ 286 \ m\mu, \ E_{1\,cm}^{1\%} \ 248$$

(f) 7-(sydnone-3-acetamido)-3-(4-methylpyrimidin - 2-ylthiomehyl)-3-cephem-4-carboxylic acid. M.P. 203–205° C. (decomposed).

UV, in 95% ethanol, $$\lambda_{max}. \ 251 \ and \ 280 \ m\mu, \ E_{1\,cm}^{1\%} \ 367 \ and \ 372$$

(g) 7-(sydone-3-acetamido)-3-[5 - (2 - thienyl) - 1,3,4-oxadiazol-2-ylthiomethyl] - 3 - cephem - 4 - carboxylic acid. M.P. 186–187° C. (decomposed).

(h) 7 - (sydnone - 3 - acetamido) - 3 - (4 - methyl-4H-1,2,4-triazol - 3 - ylthiomethyl) - 3 - cephem - 4 - carboxylic acid. M.P. 155–160° C. (decomposed).

UV, in phosphate buffer at pH 6.4, $$\lambda_{max}. \ 279 \ m\mu, \ E_{1\,cm}^{1\%} \ 228$$

(i) 7-(sydnone-3-acetamido)-3-(4,5-dimethyl - 4H - 1,2,4 - triazol-3-ylthiomethyl)-3-cephem-4-carboxylic acid. M.P. 172–180° C. (decomposed).

UV, in phosphate buffer at pH 6.4, $$\lambda_{max}.\ 279\ m\mu,\ E_{1\ cm.}^{1\%}\ 237$$

(j) 7 - (sydnone-3-acetamido)-3-(1-phenyl - 1H - 1,2,4-triazol-3-ylthiomethyl) - 3 - cephem - 4 - carboxylic acid. M.P. 187–189° C. (decomposed).
UV, in 95% ethanol, $$\lambda_{max}.\ 274\ m\mu,\ E_{1\ cm.}^{1\%}\ 408$$

(k) 7 - (sydnone-3-acetamido)-3-(4-phenyl-5-methyl-4H - 1,2,4 - triazol-3-ylthiomethyl)-3-cephem-4-carboxylic acid. M.P. 199–204° C. (decomposed).
UV, in phosphate buffer at pH 6.4, $$\lambda_{max}.\ 281\ m\mu,\ E_{1\ cm.}^{1\%}\ 211$$

(l) 7 - (sydnone - 3 - acetamido) - 3 - (1 - methyl-1H-1,2,4 - triazol - 5 - ylthiomethyl) - 3 - cephem - 4 - carboxylic acid. M.P. 103–107° C. (decomposed).
UV, in phosphate buffer at pH 6.4.

$$\lambda_{max}.\ 278\ m\mu,\ E_{1\ cm.}^{1\%}\ 259$$

(m) 7 - (sydnone - 3 - acetamido) - 3 - (1,3 - dimethyl-1H - 1,2,4 - triazol - 5 - ylthiomethyl) - 3 - cephem - 4 - carboxylic acid.
UV, in phosphate buffer at pH 6.4.

$$\lambda_{max}.\ 284\ m\mu,\ E_{1\ cm.}^{1\%}\ 208$$

(n) 7 - (sydnone - 3 - acetamido) - 3 - (4 - methyl - 5 - phenyl - 4H - 1,2,4 - triazol - 3 - ylthiomethyl) - 3 - cephem - 4 - carboxylic acid. M.P. 161–164° C. (decomposed).
UV, in phosphate buffer at pH 6.4.

$$\lambda_{max}.\ 274\ m\mu,\ E_{1\ cm.}^{1\%}\ 271$$

(o) 7 - (sydnone - 3 - acetamido) - 3 - (3 - phenyl-1,2,4 - thiadiazol - 5 - ylthiomethyl) - 3 - cephem - 4 - carboxylic acid. M.P. 199–200° C. (decomposed).
UV, in 95% ethanol, $$\lambda_{max}.\ 283\ m\mu,\ E_{1\ cm.}^{1\%}\ 416$$

(p) 7 - (sydnone - acetamido) - 3 - (9H - purin-8-ylthiomethyl) - 3 - cephem - 4 - carboxylic acid. M.P. 172–180° C. (decomposed).
UV, in phosphate buffer at pH 6.4.

$$\lambda_{max}.\ 294\ m\mu,\ E_{1\ cm.}^{1\%}\ 425$$

(q) 7 - (4 - methylsydnone - 3 - acetamido) - 3 - (5-methyl - 1,3,4 - oxadiazol - 2 - ylthiomethyl) - 3 - cephem-4-carboxylic acid. M.P. 140–150° C. (decomposed).
UV, in phosphate buffer at pH 6.4, $$\lambda_{max}.\ 261.5\ m\mu,\ E_{1\ cm.}^{1\%}\ 274$$

(r) 7 - (4-methylsydnone - 3 - acetamido) - 3 - (1-methyltetrazol - 5 - ylthiomethyl) - 3 - cephem - 4 - carboxylic acid. M.P. 140–145° C. (decomposed).
UV, in phosphate buffer at 6.4, $$\lambda_{max}.\ 274.5\ m\mu,\ E_{1\ cm.}^{1\%}\ 223$$

(s) 7 - (4 - methylsydnone - 3 - acetamido) - 3 - (5-methyl-1,3,4-thiadiazol - 2 - ylthiomethyl) - 3 - cephem-4-carboxylic acid. M.P. 133–140° C. (decomposed).
UV, in phosphate buffer at pH 6.4, $$\lambda_{max}.\ 282\ m\mu,\ E_{1\ cm.}^{1\%}\ 251$$

(t) 7 - (4 - methylsydnone - 3 - acetamido) - 3 - (1,3,4-thiadiazol - 2 - ylthiomethyl) - 3 - cephem - 4 - carboxylic acid. M.P. 138–145° C. (decomposed).
UV, in phosphate buffer at pH 6.4.

$$\lambda_{max}.\ 279\ m\mu,\ E_{1\ cm.}^{1\%}\ 245$$

EXAMPLE 8

To a suspension of 2.0 g. of 7-(sydnone-3-acetamido)-cephalosporanic acid and 790 mg. of 5-propyl-1,3,4-oxadiazole-2-thiol in 20 ml. of water was added 3 ml. of 10% aqueous sodium hydrogen carbonate. The solution was stirred at 60° C. for 4 hours and then cooled to room temperature. The resulting reaction mixture was extracted with ethylacetate and adjusted with 10% aqueous hydrochloric acid to pH 1.0–2.0. The organic layer obtained was washed with saturated sodium chloride solution, dried over sodium sulfate and concentrated in vacuo leaving a gel which was purified with ether to obtain 1.0 g. of powders, 7-(sydnone-3-acetamido)-3-(5 - propyl - 1,3,4-oxadiazol-2-ylthiomethyl)-3-cephem - 4 - carboxylic acid, melting at 153–157° C.
UV, in 95% ethanol, $$\lambda_{max}.\ 280\ m\mu,\ E_{1\ cm.}^{1\%}\ 265$$

EXAMPLE 9

Following the procedure of Example 8 but substituting 5-isopropyl-1,3,4-oxadiozale-2-thiol for 5-propyl - 1,3,4-oxadiazole - 2 - thiol, there was obtained 7 - (sydnone-3-acetamido) - 3 - (5 - isopropyl - 1,3,4 - oxadiazol - 2-ylthiomethyl)-3-cephem-4-carboxylic acid, melting at 131–135° C. (decomposed).
UV, in 95% ethanol, $$\lambda_{max}.\ 279\ m\mu,\ E_{1\ cm.}^{1\%}\ 250$$

EXAMPLE 10

A solution of 22.0 g. of sodium 7-(sydnone-3-acetamido)-cephalosporanate, 9.0 g. of 1-methyltetrazole-5-thiol and 6.4 g. of sodium bicarbonate in 150 ml. of Britton-Robinson-buffer (pH 5.7) consisting of acetic acid, boric acid, orthophosphoric acid and sodium hydroxide was stirred at 65° C. for 5.5 hours. The reaction mixture was adjusted with 10% hydrochloric acid to pH 4.0 and extracted with ether. The resulting aqueous layer was further acidified with hydrochloric acid to pH 2.0 and treated with ethyl acetate. The organic layer (2,000 ml.) was washed with 100 ml. of the saturated sodium chloride solution, then dried over magnesium sulfate and concentrated in vacuo to about 200 ml.

The precipitate was obtained by filtration and recrystallized from acetone to give crystals, 7-(syndone-3-acetamido)-3-(1 - methyltetrazol-5-yl)thiomethyl-3-cephem-4-carboxylic acid, melting at 186–187° C. (decomposed).
UV, in 95% ethanol, $$\lambda_{max}.\ 284-285\ m\mu,\ E_{1\ cm.}^{1\%}\ 293$$

EXAMPLE 11

Following the procedure of Example 10 but substituting 1,3-thiazole-2-thiol for 1-methyltetrazole-5-thiol, there was obtained 7 - (sydnone-3-acetamido)-3-(1,3-thiazol-2-ylthiomethyl)-3-cephem-4-carboxylic acid, melting at 92–95° C. (decomposed).
UV, in phosphate buffer at pH 6.4, $$\lambda_{max}.\ 288\ m\mu,\ E_{1\ cm.}^{1\%}\ 276.8$$

Similarly, substituting 4-methyl-1,3-thiazole-2-thiol for 1,3-thiazole-2-thiol, there was obtained 7-(sydnone-3-actamido) - 3 - (4-methyl-1,3-thiazol-2-ylthiomethyl)-3-cephem-4-carboxylic acid, melting at 192° C. (decomposed).
UV, in phosphate buffer at pH 6.4, $$\lambda_{max}.\ 282.5\ m\mu,\ E_{1\ cm.}^{1\%}\ 357.9$$

EXAMPLE 12

2.1 g. of sodium 7-(sydnone-3-acetamido) cephalosporanate was dissolved in a solution of 0.6 g. of 4-mercaptopyridine in 20 ml. of water. The resultant solution was adjusted to pH 7.0 with a diluted sodium hydroxide solution and treated at 60° C. for 7 hours. The reaction mixture was concentrated to leave an oily residue which was treated with acetone. The residue was obtained from filtration, dissolved in water and acidified with hydrochloric acid to form a precipitate. The precipitate was treated with water to obtain amorphous products, which was recrystallized from 50% tetrahydrofuran, 7-(sydnone-3-acetamido)-3-(4 - pyridylthiomethyl)-3-cephem-4-carboxylic acid.

EXAMPLE 13

7-amino-3-(5 - methyl-1,3,4-thiadiazol-2-ylthiomethyl)-3-cephem-4-carboxylic acid was prepared from both 7-aminocephalosporanic acid and 5-methyl-1,3,4-thiadiazole-2-thiol. A solution of 1.0 g. of 7-amino-3-(5-methyl-1,3,4-thiadiazol-2-ylthiomethyl)-3-cephem - 4 - carboxylic acid and 730 mg. of triethylamine in 10 ml. of chloroform was added to a solution which was prepared by adding 900 mg. of dicyclohexylcarbodiimide to 850 mg. of sydnone-3-acetic acid in 20 ml. of tetrahydrofuran and by stirring the mixture at 0° C. for 30 minutes. The mixture was stirred for 4 hours at 0° C. and then at room temperature. After the reaction was terminated, the reaction mixture was filtered. The filtrate was treated with water and the aqueous layer was washed with ethyl acetate. The resultant aqueous layer was adjusted to pH 2.0 with 10% hydrochloric acid and extracted with ethyl acetate. After the extract was washed with a saturated sodium hydroxide solution and dried over sodium sulfate, removal of ethyl acetate and recrystallization from acetone yielded 121 mg. of powders, 7-(sydnone-3-acetamido) - 3 - (5-methyl-1,3,4-thiadiazol-2-ylthiomethyl)-3-cephem-4-carboxylic acid, melting at 167–169° C.

UV, in a phosphate buffer at pH 6.4, $\lambda_{max.}$ 279 m$\mu$, $E^{1\%}_{1\,cm.}$ 364

EXAMPLE 14

A suspension of 0.4 g. of 7-(sydnone-3-acetamido)-cephalosporanic acid and 0.15 ml. of mercaptoacetic acid in 20 ml. of water was adjusted to pH 7.0 with diluted sodium hydroxide and reacted for 7 hours at 60° C. The resultant solution was cooled, adjusted to pH 2.0 with diluted hydrochloric acid and extracted three times with ethyl acetate. The extract was washed with 50% sodium chloride solution, dried oved sodium sulfate, evaporated and treated with ether to obtain a powder (100 mg.) of 7-(sydnone - 3 - acetamido)-3-carboxymethylthiomethyl-3-cephem-4-carboxylic acid, melting at 120° C. (decomposed).

UV, in water, $\lambda_{max.}$ 277 m$\mu$, $E^{1\%}_{1\,cm.}$ 215

EXAMPLE 15

A solution of 0.4 g. of 7-(sydnone-3-acetamido)-cephalosporanic acid and 0.2 g. of cystine in 10 ml. of water was adjusted to pH 7.0 with diluted sodium hydroxide and reacted for 40 hours at 42° C. The reaction mixture was passed through a column with Dowex 1 (×8) (in acetate form). The absorbent was washed with water and eluted with a pyridine-acetate buffer solution (pH 5.6), evaporated to leave a concentrate which was treated with acetone and maintained in cool to obtain 100 mg. of 7 - (sydnone-3-acetamido)-3-(2-amino-2-carboxyethylthiomethyl) - 3 - cephem - 4 - carboxylic acid melting at 158° C. (decomposed).

UV in 95% ethanol, $\lambda_{max.}$ 270 m$\mu$, $E^{1\%}_{1\,cm.}$ 113

EXAMPLE 16

Following the procedure of Example 15 but substituting 2-aminoethylmercaptane for cystine, there was obtained 7 - (sydnone-3-acetamido)-3-(2-aminoethylthio)-methyl-3-cephem-4-carboxylic acid, melting at 208° C. (decomposed).

UV in 95% ethanol, $\lambda_{max.}$ 277 m$\mu$, $E^{1\%}_{1\,cm.}$ 125

EXAMPLE 17

A solution of 440 mg. of sodium 7-(sydnone-3-acetamido) cephalosporanate and 84 mg. of sodium bicarbonate in 4 ml. of water was added to a solution of 140 mg. of benzenethiol in 4 ml. of acetone. The resultant solution was stirred for 4 hours at 65° C., allowed to stand, filtered, adjusted to pH 4.5 with diluted sulfuric acid and treated with ether. The aqueous layer separated was adjusted to pH 3.0 and extracted with ethyl acetate. The ethyl acetate layer was washed with water, dried over sodium sulfate and concentrated to leave a yellow powder which was then extracted with a 1:1 benzene-ethyl acetate solution. The extract was concentrated to leave a yellow powder which was dissolved in ethyl acetate, then chromatographed on silica-gel and eluted with ethyl acetate. The eluate was evaporated and treated with an acetone-ethylacetate solution to obtain 10 mg. of 7-(sydnone-3-acetamido) - 3 - phenylthiomethyl-3-cephem-4-carboxylic acid melting at 175° C. (decomposed).

UV, in 95% ethanol, $\lambda_{max.}$ 283 and 255 m$\mu$, $E^{1\%}_{1\,cm.}$ 297 and 268

EXAMPLE 18

Following the procedure of Example 17 but substituting the appropriate thiols for benzenthiol, there were obtained the following compounds:

(a) 7 - (sydnone - 3-acetamido)-3-p-methylphenylthiomethyl-3-cephem-4-carboxylic acid. M.P. 125° C. (decomposed).

UV, in 95% ethanol, $\lambda_{max.}$ 253 m$\mu$, $E^{1\%}_{1\,cm.}$ 290

$\lambda_{inf.}$ 286 m$\mu$, $E^{1\%}_{1\,cm.}$ 130

(b) 7-(sydnone-3-acetamido)-3-p-nitrophenylthiomethyl-3-cephem-4-carboxylic acid. M.P. 110° C. (decomposed).

UV, in 95% ethanol, $\lambda_{max.}$ 335 m$\mu$.

(c) 7 - (sydnone - 3-acetamido)-3-o-aminophenylthiomethyl-3-cephem-4-carboxylic acid. M.P. 153° C. (decomposed).

UV, in 95% ethanol, $\lambda_{max.}$ 294 m$\mu$, $E^{1\%}_{1\,cm.}$ 242

$\lambda_{inf.}$ 256 m$\mu$, $E^{1\%}_{1\,cm.}$ 225

(d) 7 - (sydnone-3-acetamido)-3-o-carboxyphenylthiomethyl-3-cephem-4-carboxylic acid. M.P. 110–130° C. (decomposed).

UV, in 95% ethanol, $\lambda_{max.}$ 262 and 250 m$\mu$, $E^{1\%}_{1\,cm.}$ 270 and 254

(e) 7 - (sydnone - 3-acetamido)-3-p-chlorophenylthiomethyl-3-cephem-4-carboxylic acid. M.P. 161–163° C. (decomposed).

UV, in 95% ethanol, $\lambda_{max.}$ 261 m$\mu$, $E^{1\%}_{1\,cm.}$ 274

EXAMPLE 19

A solution of 5.48 g. of sodium 7-(sydnone-3-acetamido) cephalosphoranate and 4.0 g. of potassium thiobenzoate in 180 ml. of a phosphate buffer (pH 6.4) was reacted for 7 hours at 65° C. with stirring and then cooled to 5° C. The reaction mixture was adjusted to pH 2.0 with 10% hydrochloric acid and extracted with 1 liter of ethyl acetate. The extract was washed with water, dried over sodium sulphate and concentrated under reduced pressure. The resultant residue was treated with ether to obtain a yellow orange solid which was then washed with acetone and recrystallized from an aqueous acetone solution to obtain a white prism (902 mg.) of 7 - (sydnone-3-acetamido)-3-benzylthiomethyl-3-cephem-4-carboxylic acid melting at 201–202° C.

UV, in a phosphate buffer at pH 6.4, $\lambda_{max.}$ 277 and 245 m$\mu$, $E^{1\%}_{1\,cm.}$ 526 and 247.5

EXAMPLE 20

Following the procedure of Example 19 but substituting the appropriate thioacid for potassium thiobenzoate, there were obtained the following compounds:

(a) 7 - (sydnone - 3-acetamido)-3-acetylthiomethyl-3-cephem-4-carboxylic acid. M.P. 193–196° C. (decomposed).

UV, in a phosphate buffer at pH 6.4, $\lambda_{max.}$ 275 m$\mu$, $E_{1\ cm.}^{1\%}$ 356

(b) 7 - (sydnone-3-acetamido)-3-(2 - thienylthiomethyl)-3-cephem-4-carboxylic acid. M.P. 213–214° C. (decomposed).

UV, in a phosphate buffer at pH 6.4, $\lambda_{max.}$ 294 and 255 m$\mu$, $E_{1\ cm.}^{1\%}$ 481 and 334

EXAMPLE 21

Following the procedures of Examples 1 to 20 but substituting sydnone acids, thiols and 7-sydnone-acylated cephalosporins or 3-thiolated cephalosporins for sydnone acids, thiols and 7-sydnone-acylates or 3-thiolate used therein, there are obtained the corresponding compounds as follows:

7-(sydnone-3-acetamido)-3-methylthiomethyl-3-cephem-4-carboxylic acid
7-(sydnone-3-acetamido)-3-chloroethylthiomethyl-3-cephem-4-carboxylic acid
7-(sydnone-3-acetamido)-3-(1-naphthylthiomethyl)-3-cephem-4-carboxylic acid
7-(sydnone-3-acetamido)-3-(2-pyridylthiomethyl)-3-cephem-4-carboxylic acid
7-(sydnone-3-acetamido)-3-(5-nitro-2-pyridylthiomethyl)-3-cephem-4-carboxylic acid
7-(sydnone-3-acetamido)-3-(3-methyl-1-phenyl-5-pyrazolylthiomethyl)-3-cephem-4-carboxylic acid
7-(sydnone-3-acetamido)-3-(4-methyl-2-imidazolylthiomethyl)-3-cephem-4-carboxylic acid
4-(sydnone-3-acetamido)-3-(4-amino-1-methyl-2-imidazolylthiomethyl)-3-cephem-4-carboxylic acid
7-(sydnone-3-acetamido)-3-(6-methoxy-3-pyridazinylthiomethyl)-3-cephem-4-carboxylic acid
7-(sydnone-3-acetamido)3-(2-amino-6-nitro-4-pyrimidinylthiomethyl)-3-cephem-4-carboxylic acid
7(sydnone-3-acetamido)-3-(5-methyl-6-phenyl-as-triazin-3-ylthiomethyl)-3-cephem-4-carboxylic acid
7-(sydnone-3-acetamido)-3-(1-benzyl-1H-tetrazol-5-ylthiomethyl)-3-cephem-4-carboxylic acid
7-(sydnone-3-acetamido)-3-(4-methyl-2-oxazolylthiomethyl)-3-cephem-4-carboxylic acid
7-(sydnone-3-acetamido)-3-(3-phenyl-1,2,4-oxadiazol-5-ylthiomethyl)-3-cephem-4-carboxylic acid
7-(sydnone-3-acetamido)-3-(4,5-dimethyl-2-thiazolylthiomethyl)-3-cephem-4-carboxylic acid
7-(3-isopropylsydnone-4-carbonamido)-3-(5-methyl-1,3,4-oxadiazol-2-ylthiomethyl)-3-cephem-4-carboxylic acid
7-(3-phenylsydnone-4-carbonamido)-3-(1-methyl-1H-tetrazol-5-ylthiomethyl)-3-cephem-4-carboxylic acid
7-(3-benzylsydnone-4-carbonamido)-3-(1,3,4-thiazol-2-ylthiomethyl)-3-cephem-4-carboxylic acid
7-(4-bromosydnone-3-acetamido)-3-(5-methyl-1,3,4-oxadiazol-2-ylthiomethyl)-3-cephem-4-carboxylic acid
7-(4-methylsydnone-3-acetamido)-3-[5-(2-thienyl)-1,3,4-oxadiazol-2-ylthiomethyl]-3-cephem-4-carboxylic acid
7-(4-methylsydnone-3-acetamido)-3-(4-pyridinecarbonylthiomethyl)-3-cephem-4-carboxylic acid
7-(4-hydroxymethylsydnone-3-acetamido)-3-(1-methyl-1H-tetrazol-5-ylthiomethyl)-3-cephem-4-carboxylic acid
7-(4-chloromethylsydnone-3-acetamido)-3-(5-methyl-1,3,4-thiadiazol-2-ylthiomethyl)-3-cephem-4-carboxylic acid
7-(4-phenylsydnone-3-acetamido)-3-(5-methyl-1,3,4-oxadiazol-2-ylthiomethyl)-3-cephem-4-carboxylic acid
7-(4-phenylsydnone-3-acetamido)-3-(1-methyl-1H-tetrazol-5-ylthiomethyl)-3-cephem-4-carboxylic acid
7-(4-p-chlorophenylsydnone-3-acetamido)-3-(5-methyl-1,3,4-thiadiazol-2-ylthiomethyl)-3-cephem-4-carboxylic acid
7-(4-phenylsydnone-3-acetamido)-3-[5-(2-thienyl)-1,3,4-oxadiazol-2-ylthiomethyl)-3-cephem-4-carboxylic acid
7-(4-benzylsydnone-3-acetamido)-3-(1,3,4-thiadiazol-2-ylthiomethyl)-3-cephem-3-carboxylic acid
7-(4-m-chlorobenzylsydnone-3-acetamido)-3-(5-methyl-1,3,4-oxadiazol-2-ylthiomethyl)-3-cephem-4-carboxylic acid
7-(4-p-bromobenzylsydnone-3-acetamido)-3-(1-methyl-1H-tetrazol-5-ylthiomethyl)-3-cephem-4-carboxylic acid
7-(4-phenethylsydnone-3-acetamido)-3-(1,3,4-oxadiazol-2-ylthiomethyl)-3-cephem-4-carboxylic acid
7-(3-methylsydnone-4-acetamido)-3-(5-methyl-1,3,4-thiazol-2-ylthiomethyl)-3-cephem-4-carboxylic acid
7-(3-phenylsydnone-4-acetamido)-3-(1-methyl-1H-tetrazol-5-ylthiomethyl)-3-cephem-4-carboxylic acid
7-(3-benzylsydnone-4-acetamido)-3-[5-(2-thienyl)-1,3,4-oxadiazol-2-ylthiomethyl)-3-cephem-4-carboxylic acid
7-(3-p-chlorophenylsydnone-4-acetamido)-3-(1,3-dimethyl-1H-1,2,4-triazol-5-ylthiomethyl)-3-cephem-4-carboxylic acid
7-(3-m-chlorobenzylsydnone-4-acetamido)-3-(1-phenyl-1H-1,2,4-triazol-3-ylthiomethyl)-3-cephem-4-carboxylic acid
7-[sydnone-3-($\alpha$-methyl)acetamido]-3-(4-methyl-5-phenyl-4H-1,2,4-triazol-3-ylthiomethyl)-3-cephem-4-carboxylic acid
7-[4-methylsydnone-3-($\alpha$-phenyl)acetamido]-3-(5-methyl-1,3,4-oxadiazol-2-ylthiomethyl)-3-cephem-4-carboxylic acid
7-[sydone-3-($\alpha$-benzyl)acetamido]-3-(1-methyl-1H-tetrazol-5-ylthiomethyl)-3-cephem-4-carboxylic acid
7-[3-methylsydnone-4-($\alpha$-methyl)acetamido]-3-(5-methyl-1,3,4-thiadiazol-2-ylthiomethyl)-3-cephem-4-carboxylic acid
7-(sydnone-3-propionamido)-3-(4-phenyl-4H-1,2,4-triazol-3-ylthiomethyl)-3-cephem-4-carboxylic acid
7-(sydnone-3-butanamido)-3-(1,3,4-thiadiazol-2-ylthiomethyl)-3-cephem-4-carboxylic acid
7-(3-methylsydnone-4-propionamido)-3-(5-methyl-1,3,4-oxadiazol-2-ylthiomethyl)-3-cephem-4-carboxylic acid
7-(3-phenylsydnone-4-butanamido)-3-(3-phenyl-1,2,4-thiadiazol-5-ylthiomethyl)-3-cephem-4-carboxylic acid
7-[p-(3-sydnonyl)phenylacetamido]-3-(5-methyl-1,3,4-oxadiazol-2-ylthiomethyl)-3-cephem-4-carboxylic acid
7-[p-(4-methyl-3-sydnonyl)phenylacetamido]-3-(1-methyl-1H-tetrazol-5-ylthiomethyl)-3-cephem-4-carboxylic acid
7-[-(3-methyl-4-sydnonyl)phenylacetamido]3-(5-methyl-1,3,4-thiadiazol-2-ylthiomethyl)-3-cephem-4-carboxylic acid
7-[p-(3-phenyl-4-sydnonyl)phenylacetamido]-3-(1,3,4-thiadiazol-2-ylthiomethyl)-3-cephem-4-carboxylic acid

What we claim is:

1. A compound of the formula $$Y-CONH-CH-CH\begin{array}{c}S\\ \diagup\quad\diagdown\\ \end{array}CH_2 \\ | \qquad\qquad | \\ CO-N\qquad C-CH_2-S-Z \\ \diagdown\quad\diagup \\ C \\ | \\ COOM$$

wherein Y is the group $$\begin{array}{cc} N-N-A- & N-N-R'' \\ O\diagup\ \pm\ \ | & \text{or}\quad O\diagup\ \pm\ \ | \\ O=C-C-R' & O=C-C-(A)_m^- \end{array}$$

wherein
R' is hydrogen, halogen, lower alkyl, hydroxy-lower alkyl, halo-lower alkyl, phenyl-lower alkyl, the lower alkyl group having from 1 to 4 carbon atoms, phenyl, naphthy, substituted phenyl, substituted naphthyl, or substituted phenyl-lower alkyl, wherein substituent is lower alkyl, hydroxy-lower alkyl, lower alkoxy, carboxy, halogen, hydroxy, amino, or nitro, the lower alkyl and lower alkoxy groups each having from 1 to 4 carbon atoms;

R″ is lower alkyl, hydroxy-lower alkyl, halo-lower alkyl, phenyl-lower alkyl, the lower alkyl group having from 1 to 4 carbon atoms, phenyl, naphthyl, substituted phenyl, substituted naphthyl, or substituted phenyl-lower alkyl, wherein substituent is lower alkyl, hydroxy-lower alkyl, halogen, hydroxy, nitro, amino, carboxy or lower alkoxy, the lower alkyl and lower alkoxy groups each having from 1 to 4 carbon atoms;

A is lower alkylene, hydroxy-lower alkylene, halo-lower alkylene, phenylene-lower alkyl, or halo-phenylene-lower alkyl, the lower alkyl and the lower alkylene groups having from 1 to 4 carbon atoms;

Z is lower alkyl, carboxy-lower alkyl, halo-lower alkyl, hydroxy-lower alkyl, amino-lower alkyl, phenyl-lower alkyl, carboxamido-lower alkyl, lower alkyl-carbonyl, the lower alkyl having from 1 to 4 carbon atoms, benzoyl, halo-benzoyl, nitro-benzoyl, amino-benzoyl, pyridyl-carbonyl, thenoyl, phenyl, naphthyl, pyridyl, pyrazolyl, imidazolyl, pyridazyl, pyrimidyl, pyrazyl, triazolyl, triazyl, tetrazolyl, oxazolyl, oxadiazolyl, thiazolyl, thiadiazolyl, thiatriazolyl, triazolopyridyl, puryl substituted phenyl, substituted naphthyl or substituted phenyl-lower alkyl, wherein substituent is lower alkyl, hydroxy-lower alkyl, halogen, hydroxy, nitro, amino, hydroxy, carboxy or lower alkoxy, the lower alkyl and lower alkoxy groups each having from 1 to 4 carbon atoms;

$m$ is zero or one; and

M is hydrogen or a pharmaceutically acceptable cation.

2. In accordance with claim 1, a compound selected from the group consisting of 7-(sydnone-3-acetamido)-3 - (5-methyl-1,3,4-oxadiazol-2-ylthiomethyl)-3-cephem-4-carboxylic acid and a pharmaceutically acceptable salt thereof.

3. In accordance with claim 1, a compound selected from the group consisting of 7-(sydnone-3-acetamido)-3 - (1 - methyl-1H-tetrazol-5-ylthiomethyl)-3-cephem-4-carboxylic acid and a pharmaceutically acceptable salt thereof.

4. In accordance with claim 1, a compound selected from the group consisting of 7-(sydnone-3-acetamido)-3 - [5 - (2 - thienyl)-1,3,4-oxadiazol-2-ylthiomethyl)-3-cephem-4-carboxylic acid and a pharmaceutically acceptable salt thereof.

5. In accordance with claim 1, a compound selected from the group consisting of 7-(sydnone-3-acetamido)-3 - (1,3,4 - thiadiazol - 2 - ylthiomethyl) - 3 - cephem - 4-carboxylic acid and a pharmaceutically acceptable salt thereof.

6. In accordance with claim 1, a compound selected from the group consisting of 7-(sydnone-3-acetamido)-3 - (5 - methyl-1,3,4-thiadiazol-2-ylthiomethyl)-3-cephem-4-carboxylic acid and a pharmaceutically acceptable salt thereof.

7. In accordance with claim 1, a compound selected from the group consisting of 7-(4-methylsydnone-3-acetamido) - 3 (5 - methyl - 1,3,4-oxadiazol-2-ylthiomethyl)-3-cephem-4-carboxylic acid and a pharmaceutically acceptable salt thereof.

8. In accordance with claim 1, a compound selected from the group consisting of 7-(4-methylsydnone-3-acetamido) - 3 - (1 - methyl-1H-tetrazol-5-ylthiomethyl)-3-cephem-4-carboxylic acid and a pharmaceutically acceptable salt thereof.

9. In accordance with claim 1, a compound selected from the group consisting of 7-(4-methylsydnone-3-acetamido) - (5 - methyl - 1,3,4-triadiazol-2-ylthiomethyl)-3-cephem-4-carboxylic and a pharmaceutically acceptable salt thereof.

10. In accordance with claim 1, a compound selected from the group consisting of 7-(4-methylsydnone-3-acetamido) - 3 - (1,3,4 - thiadiazol - 2 - ylthiomethyl)-3-cephem-4-carboxylic acid and a pharmaceutically acceptable salt thereof.

11. In accordance with claim 1, a compound selected from the group consisting of 7-(sydnone-3-acetamido)-3-acetylthiomethyl - 3 - cephem-4-carboxylic acid and a pharmaceutically acceptable salt thereof.

References Cited

UNITED STATES PATENTS 3,345,368  10/1967  Lewis et al.

NICHOLAS S. RIZZO, Primary Examiner

U.S. Cl. X.R.

424—246